US011016639B2

(12) United States Patent
Seymour et al.

(10) Patent No.: US 11,016,639 B2
(45) Date of Patent: May 25, 2021

(54) MULTIPLE OUTLET SHOWER CONTROL

(71) Applicant: Kohler Mira Limited, Gloucestershire (GB)

(72) Inventors: Christopher Laurence Seymour, Gloucestershire (GB); Alexander Colin Fagg, Gloucestershire (GB); Richard Harcourt Burns, Gloucestershire (GB); Karl Antony Fearnley, Gloucestershire (GB); Christopher John Duke, Gloucestershire (GB)

(73) Assignee: KOHLER MIRA LIMITED

( * ) Notice: Subject to any disclaimer, the term of this patent is extended or adjusted under 35 U.S.C. 154(b) by 90 days.

(21) Appl. No.: 16/510,009

(22) Filed: Jul. 12, 2019

(65) Prior Publication Data
US 2019/0332234 A1 Oct. 31, 2019

Related U.S. Application Data

(63) Continuation of application No. PCT/GB2018/050028, filed on Jan. 8, 2018.

(30) Foreign Application Priority Data

Jan. 13, 2017 (GB) ..................................... 1700630

(51) Int. Cl.
*G06F 3/0484* (2013.01)
*B05B 1/18* (2006.01)
*E03C 1/05* (2006.01)

(52) U.S. Cl.
CPC ............ *G06F 3/0484* (2013.01); *B05B 1/185* (2013.01); *E03C 1/055* (2013.01)

(58) Field of Classification Search
CPC ........ G06F 3/0484; B05B 1/185; E03C 1/055
(Continued)

(56) References Cited

U.S. PATENT DOCUMENTS 8,646,121 B2 * 2/2014 Nguyen ................. A61H 33/06
4/601
2006/0186215 A1 * 8/2006 Logan ..................... E03C 1/055
236/12.2
(Continued)

FOREIGN PATENT DOCUMENTS

CN 203247649 10/2013
CN 107367973 11/2017
(Continued)

OTHER PUBLICATIONS

International Search Report re Application No. PCT/GB2018/050028; 2pgs.

*Primary Examiner* — Tuan N Nguyen
(74) *Attorney, Agent, or Firm* — Foley & Lardner LLP

(57) ABSTRACT

A reconfigurable bathing apparatus includes a first showerhead, the first showerhead being connected to a first fluid outlet; a second showerhead, the second showerhead being connected to a second fluid outlet; and a processor, the processor being arranged to control fluid flow through the first fluid outlet in response to a first control action and to control fluid flow through the second fluid outlet in response to a second control action. The processor is arranged to be able to receive and implement a request to reconfigure its response to the control actions such that the first control action controls the second fluid outlet and the second control action controls the first fluid outlet.

17 Claims, 4 Drawing Sheets

(58) Field of Classification Search
USPC .............................................. 4/601
See application file for complete search history.

(56) References Cited

U.S. PATENT DOCUMENTS

2015/0268848 A1    9/2015  Freier
2018/0310775 A1*  11/2018  Degraye ................. E03C 1/055

FOREIGN PATENT DOCUMENTS

GB          2480291      11/2011
WO    WO2018/130810    7/2018

* cited by examiner

MULTIPLE OUTLET SHOWER CONTROL

CROSS-REFERENCE TO RELATED PATENT APPLICATIONS

The present application is a Continuation of International Application No. PCT/GB2018/050028, filed Jan. 8, 2018, which claim priority to and the benefit of United Kingdom Patent Application No. GB 1700630.5, filed Jan. 13, 2017. The entire disclosures of each of the foregoing applications are incorporated by reference herein.

This application is related to and incorporates by reference (but does not claim priority to) the following United Kingdom Patent Applications, each of which were filed on Jan. 13, 2017: GB 1700633.9; GB 1700631.3; and GB 1700636.2.

BACKGROUND

The invention relates to showers with multiple outlets, and in particular to an option for rectifying an incorrect installation of such a shower. More specifically, the invention relates to a method and system for rectifying a common issue with the installation of dual outlet showers which have two outlets from a single valve box.

Standard dual outlet showers have two separate showerheads connected to a single valve box. Usually, one showerhead is a fixed showerhead, which is often wall- or ceiling-mounted, and one showerhead is a hand-held, moveable showerhead. A releasable mounting is usually provided for the hand-held showerhead.

A valve box for a dual outlet shower has two fluid outlets. Each fluid outlet is arranged to be connected to one of the two shower heads, usually via respective hoses or pipes. As both showerheads are connected to the same valve box, it is common for dual outlet showers to be incorrectly installed such that the fixed showerhead is connected to the fluid outlet intended to be connected to the hand-held showerhead, and vice versa. In this scenario, the shower controls are misaligned and the controls intended for the fixed showerhead will control the handheld showerhead, and vice versa. The hoses or pipes have to be disconnected and reconnected to the correct outlets to remedy this problem, which is disruptive and time-consuming, particularly when the valve box is not readily accessible and the fault is only noticed after the valve box has been tiled over, for example.

SUMMARY

An exemplary embodiment relates to a reconfigurable bathing apparatus that includes a first showerhead, the first showerhead being connected to a first fluid outlet, a second showerhead, the second showerhead being connected to a second fluid outlet, and a processor, the processor being arranged to control fluid flow through the first fluid outlet in response to a first control action and to control fluid flow through the second fluid outlet in response to a second control action. The processor is arranged to be able to receive and implement a request to reconfigure its response to the control actions such that the first control action controls the second fluid outlet and the second control action controls the first fluid outlet.

Another exemplary embodiment relates to a computer-implemented method of reconfiguring shower outlet controls for a shower that includes a first showerhead, the first showerhead being connected to a first fluid outlet, and a second showerhead, the second showerhead being connected to a second fluid outlet. The first fluid outlet is arranged to be controlled by a first control action the second fluid outlet is arranged to be controlled by a second control action. The method includes receiving a request to reconfigure responses to the control actions such that the first control action controls the second fluid outlet and the second control action controls the first fluid outlet, and implementing the request.

Another exemplary embodiment relates to a computer application for controlling a shower having a first showerhead and a second showerhead, wherein the first showerhead and the second showerhead are each connectable to a first fluid outlet or a second fluid outlet. The application includes a first interface arranged to provide control of fluid flow through the first showerhead by receiving user input and, in response, sending a control signal arranged to control one of the first fluid outlet and the second fluid outlet. The application also includes a second interface arranged to provide control of fluid flow through the second showerhead by receiving user input and, in response, sending a control signal arranged to control the other of the first fluid outlet and the second fluid outlet. The application is arranged to allow reconfiguration of the first and second interfaces in line with which showerhead is connected to which fluid outlet.

BRIEF DESCRIPTION OF THE DRAWINGS

There now follows by way of example only a detailed description of embodiments of the present invention with reference to the accompanying drawings in which.

DETAILED DESCRIPTION

Figure 1:
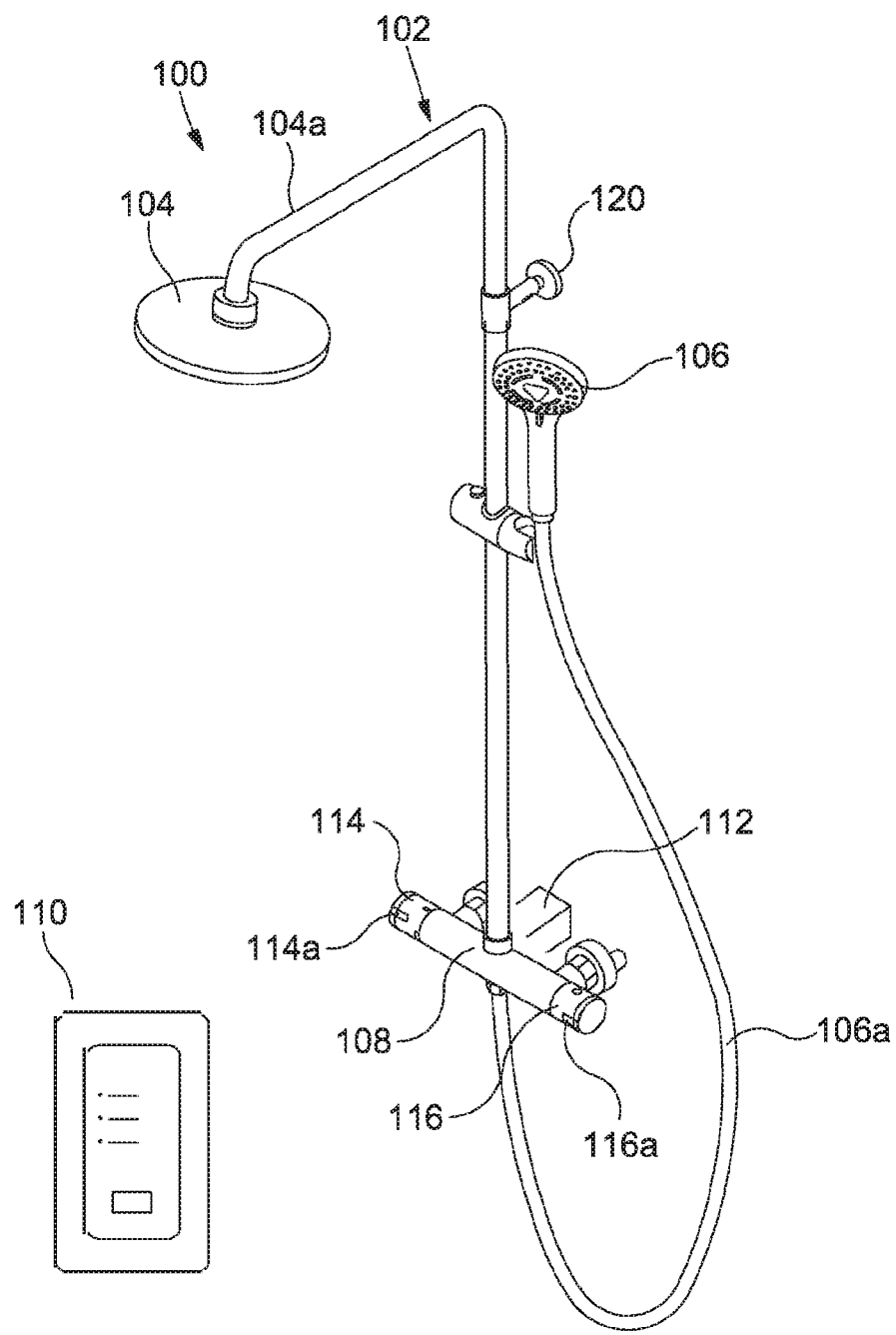
FIG. 1 is a schematic representation of a reconfigurable bathing apparatus including a dual outlet shower.

The invention may have most utility for dual-outlet showers, as dual-outlet showers normally comprise a single valve with two outlets, instead of a separate valve for each outlet, so increasing the likelihood of incorrect installation. However, the skilled person will appreciate that the present invention can be equally applied to bathing apparatuses with more than two shower outlets, and/or to bathing apparatuses where the first and second showerheads are both fixed showerheads, or both handheld showerheads, or are other, different types of showerhead.

According to a first aspect of the invention, there is provided a reconfigurable bathing apparatus comprising a first showerhead, the first showerhead being connected to a first fluid outlet, and a second showerhead, the second showerhead being connected to a second fluid outlet. The bathing apparatus additionally comprises a processor arranged to control fluid flow through the first fluid outlet in response to a first control action and to control fluid flow through the second fluid outlet in response to a second control action. The processor is arranged to be able to receive and implement a request to reconfigure its response to the control actions such that the first control action controls the second fluid outlet and the second control action controls the first fluid outlet.

In this way, if the first showerhead is intended to be controlled by the second control action but has been connected to the first fluid outlet by mistake, the controls can be reconfigured such that the first showerhead can still be controlled by the second control action, and vice versa, without requiring disconnection and reconnection of the first and second showerheads and fluid outlets. Advantageously, this apparatus allows the control actions to be aligned with the showerhead that each control action is intended to control without requiring disconnection and reconnection. The intention as to which control action controls which showerhead may be on the part of the manufacturer, installer or user. For example, a manufacturer may provide a manual explaining which control action controls which showerhead and/or provide a button labelled "first shower head", activation of which is the first control action. If the first control action controls the first fluid outlet but the first showerhead is connected to the second fluid outlet, the manual or button label would be incorrect. Implementation of the request to reconfigure the responses would correct this.

Optionally, the reconfigurable bathing apparatus further comprises a valve. The valve may comprise the first and second fluid outlets. The processor may be arranged to actuate the valve so as to control fluid flow through the first and second fluid outlets. The valve may be a dual outlet shower valve.

Optionally, the first showerhead is a hand-held showerhead and the second showerhead is a mounted showerhead.

Optionally, the first and second control actions may be either (i) use of a first control means and a second control means respectively; or (ii) differing uses of a single control means.

In embodiments with a valve, the one or more control means may communicate electronically with the processor, and the processor may electronically control the valve.

The first and second control actions may be one of the following:

(i) pressing first and second buttons, respectively;

(ii) actuating first and second levers, respectively;

(iii) rotating first and second rotary controls, respectively;

(iv) pressing a button once, and pressing the button multiple times, respectively;

(v) actuating a lever in a first direction, and actuating the lever in a second direction, respectively; and (vi) rotating a rotary control in a first direction, and either rotating the rotary control in a second direction, or pulling or depressing the rotary control, respectively.

The first and second control actions may be user interactions with a graphical user interface.

The request to reconfigure the responses to the control actions may be sent from a remote device which is not a part of the bathing apparatus.

The request may take the form of user or installer input sent via a switch or computer application.

In embodiments with a valve, the valve may be within a valve box and the request may be arranged to be received and implemented without opening, and/or without requiring any physical access to, the valve box In embodiments with a valve box, the valve box may be located in or behind a wall, floor or ceiling of a room in which the bathing apparatus is located. The processor may be within the valve box.

The processor may be integral with, on or near the valve.

The reconfigurable bathing apparatus may further comprise a housing containing the processor and the first and second fluid outlets, and the request may be received as an electronic signal from outside the housing.

The reconfigurable bathing apparatus may further comprise a label, such as a set (i.e. not intended to be changeable by a user) visible indicator, indicative of the first showerhead that is linked to the first control action and/or a label indicative of the second showerhead that is linked to the second control action. The label may be a word, engraving, arrow, light, printed or molded image or the likes indicating the corresponding showerhead.

The or each label may be part of a control means arranged to control fluid flow through the first or second fluid outlet. For example, the label for the first showerhead may be an image of the first showerhead on a control knob intended to be used to control the first showerhead. Implementation of the request may change which control means controls which fluid outlet.

According to a second aspect of the invention, there is provided a computer-implemented method of reconfiguring shower outlet controls for a shower having a first showerhead, the first showerhead being connected to a first fluid outlet, and a second showerhead, the second showerhead being connected to a second fluid outlet.

The first fluid outlet is arranged to be controlled by a first control action, and the second fluid outlet is arranged to be controlled by a second control action.

The method comprises receiving a request to reconfigure responses to the control actions such that the first control action controls the second fluid outlet and the second control action controls the first fluid outlet, and implementing the request.

The method may be implemented for the reconfigurable bathing apparatus of the first aspect of the invention.

The step of implementing the request may be performed without physical access to the first and/or second fluid outlets being required.

According to a third aspect of the invention, there is provided a computer application for controlling a shower having a first showerhead and a second showerhead, wherein the first showerhead and the second showerhead are each connectable to a first fluid outlet or a second fluid outlet. The application comprises a first interface arranged to provide control of fluid flow through the first showerhead by receiving user input and, in response, sending a control signal arranged to control one of the first fluid outlet and the second fluid outlet; and a second interface arranged to provide control of fluid flow through the second showerhead by receiving user input and, in response, sending a control signal arranged to control the other of the first fluid outlet and the second fluid outlet, the application being arranged to allow reconfiguration of the first and second interfaces in line with which showerhead is connected to which fluid outlet.

The application may be arranged to allow reconfiguration of the first and second interfaces such that the control signal sent by the first interface controls the second fluid outlet and the control signal sent by the second interface controls the first fluid outlet. For example, the first interface may initially be arranged to control the first fluid outlet. If the first showerhead is connected to the second fluid outlet, the first interface may be reconfigured to control the second fluid outlet instead of the first fluid outlet.

Each control signal may be sent via a processor which is arranged to actuate a valve so as to control fluid flow through the first and second fluid outlets.

The first and second interfaces may be one or more icons or menu options displayed by the application.

The skilled person would understand that features described with respect to one aspect of the invention may be applied, mutatis mutandis, to the other aspect of the invention.

Now turning to the accompanying drawings, the reconfigurable bathing apparatus 100 shown in FIG. 1 comprises a dual-outlet shower 102 having a first shower head 104 and a second showerhead 106. The first showerhead is a fixed showerhead 104 and the second showerhead is a moveable showerhead 106 in the embodiment being described. The dual-outlet shower 102 is wall-mounted and located in a shower cubicle (not shown) in the embodiment being described. In alternative embodiments, the dual outlet shower 102 may be located above a bath tub, or in a wet room or the likes.

The dual-outlet shower 102 further comprises a first control means 114 intended to control fluid flow and temperature through the second, moveable showerhead 106 and a second control means 116 intended to control fluid flow and temperature through the first, fixed showerhead 104.

In the embodiment being described, the dual-outlet shower 102 further comprises a wall bracket 120 arranged to affix the dual-outlet shower 102 to a wall. In alternative or additional embodiments, other attachment means may be used, or the dual-outlet shower may be free-standing.

The dual-outlet shower 102 further comprises a valve 400 having first 404 and second fluid 406 outlets, located within a valve box 108.

A pipe 104a connects the fixed showerhead 104 to an outlet 404 within the valve box 108. The first, fixed showerhead 104 is connectable to the first fluid outlet 404 or the second fluid outlet 406. In the embodiment being described, the fixed showerhead 104 is connected to the first fluid outlet 404.

A flexible hose 106a connects the second, moveable showerhead 106 to an outlet 406 within the valve box 108. The moveable showerhead 106 is connectable to the first fluid outlet 404 or the second fluid outlet 406. In the embodiment being described, the moveable showerhead 106 is connected to the second fluid outlet 406.

In the embodiment being described, the first control means 114 is a first rotatable knob and is connected to the valve box 108. Actuation of the first rotatable knob 114 is defined as the first control action.

In the embodiment being described, the second control means 116 is a second rotatable knob and is connected to the valve box 108, on the opposite side of the valve box 108 from the first control means 114. Actuation of the second rotatable knob 116 is defined as the second control action.

In alternative or additional embodiments, the first and second control means 114, 116, or additional control means, may be provided via an electronic user interface, for example on a user device 110 or a display forming part of a shower control unit.

In the embodiment being described, the first control means 114 is arranged to allow a user to adjust flow rate by actuating the first fluid inlet. The first control means 114 is intended to control fluid flow through the second showerhead 106, and so comprises a first label, 114a, the label comprising an image of a moveable showerhead in this example. However, in the embodiment being described, the first fluid inlet has been erroneously connected to the first, fixed showerhead 104 during installation. In this scenario actuating the first control means 114 controls fluid flow through the first showerhead 104, contrary to the manufacturer and installer's intention.

In the embodiment being described, the second control means 116 is arranged to allow a user to adjust flow rate by actuating the second fluid inlet. The second control means 116 is intended to control fluid flow through the first, fixed showerhead 104, and so comprises a second label 116a, the label 116a comprising an image of a fixed showerhead. However, in the embodiment being described, the second fluid inlet has been erroneously connected to the second, moveable showerhead 106 during installation, so actuating the second control means 116 controls fluid flow through the second showerhead 106, contrary to the manufacturer and installer's intention.

In the embodiment being described, the pipe 104a and hose 106a have therefore each been connected to the wrong fluid outlet.

In alternative or additional embodiments, the labels 114a, 116a may be or may comprise tactile indications of the showerhead 104, 106, in addition to, or instead of, visual markers such as an image of the showerhead or a word indicating the relevant showerhead. Alternative examples of visual markers include one or more lights which illuminate when a particular showerhead 104, 106 is in use.

The reconfigurable bathing apparatus 100 further comprises a user device 110 arranged to communicate with a processor 112. In the embodiment being described, the communication with the user device 110 is performed via Bluetooth®. In alternative or additional embodiments, the communication may be performed wirelessly, for example using WiFi or the likes, or via a wired connection. The processor 112 may have a port arranged to accept a cable in embodiments in which a wired connection is used. The user device 110 may be a smartphone, tablet or any other portable user device. In some alternative embodiments, non-portable devices may be used, for example a device integrated with shower controls, or a desktop computer arranged to communicate with the processor 112.

The processor 112 is arranged to communicate with the first 114 and second 116 control means. When the first and second control means 114, 116 are rotated, the movement does not directly control the valve 400, but rather sends a signal to the processor 112.

The processor 112 is also arranged to communicate with and control the valve 400. The processor 112 relays the signals from the first control means 114 to the valve 400 in such a way as to control the first fluid outlet 404. The processor 112 relays the signals from the second control means 116 to the valve 400 in such a way as to control the second fluid outlet. In this way, the processor 112 controls fluid flow through the first and second fluid outlets 404, 406, and thereby controls fluid flow through the first and second showerheads 104, 106, in response to actuation of the control means 114, 116 respectively.

In the embodiment being described, the processor 112 is located adjacent to the valve box 108 and the communication between the first and second control means 114, 116, the processor 112 and the valve 400 is performed via wired connections. In alternative or additional embodiments, the processor 112 may be integral with the valve box 108, or spaced from it. For example, the processor 112 may be a part of the user device 110, and the user device 110 may be arranged to control the valve 400. Communication may be performed wirelessly, for example using WiFi, Bluetooth® or the likes, or via a wired connection. In the embodiment being described, the wired connections are permanent connections and are intended not to be moved once installed. In alternative or additional embodiments in which wired connections are used, the processor 112 and valve box 108 may each have one or more ports arranged to accept cables or wires.

An installer or user may realize that the dual-outlet shower 102 has been incorrectly installed by noticing the mismatch between the control means 114, 116 and which showerhead 104, 106 is activated. In the embodiment shown in FIG. 1, the valve box 108 is integral with, and provided by a casing of, the shower controls 114, 108, 116. If the realization occurs after the shower controls have been fully assembled, it may be necessary to remove the first and second control means 114, 116, and possibly other components, to provide access to the fluid outlets 404, 406. Further, the position of the valve box 108 with respect to a wall on which it is mounted, and/or its proximity to taps on a bath tub above which it is mounted (not shown) may make access difficult.

In alternative embodiments, the realization may occur after the valve box 108 has been installed behind a barrier (for example a wall panel, bath panel or tiled wall area) which must be broken to provide access.

As such, obtaining physical access to the valve box 108 and/or to the valve 400 within the valve box may be disruptive and time consuming.

Once the installer or user has noticed the problem, a remote request can be sent to the processor 112 to reconfigure the processor's response to signals from each control means 114, 116. In the embodiment being described, the installer or user uses the user device 110 to send the request to the processor 112.

In response to the remote request, the processor 112 is reconfigured such that the processor 112 relays the signals from the first control means 114 to the valve 400 in such a way as to control the second fluid outlet 406, and relays the signals from the second control means 116 to the valve 400 in such a way as to control the first fluid outlet 404. No physical access to the valve 400 or valve box 108 is therefore required.

Figure 2:
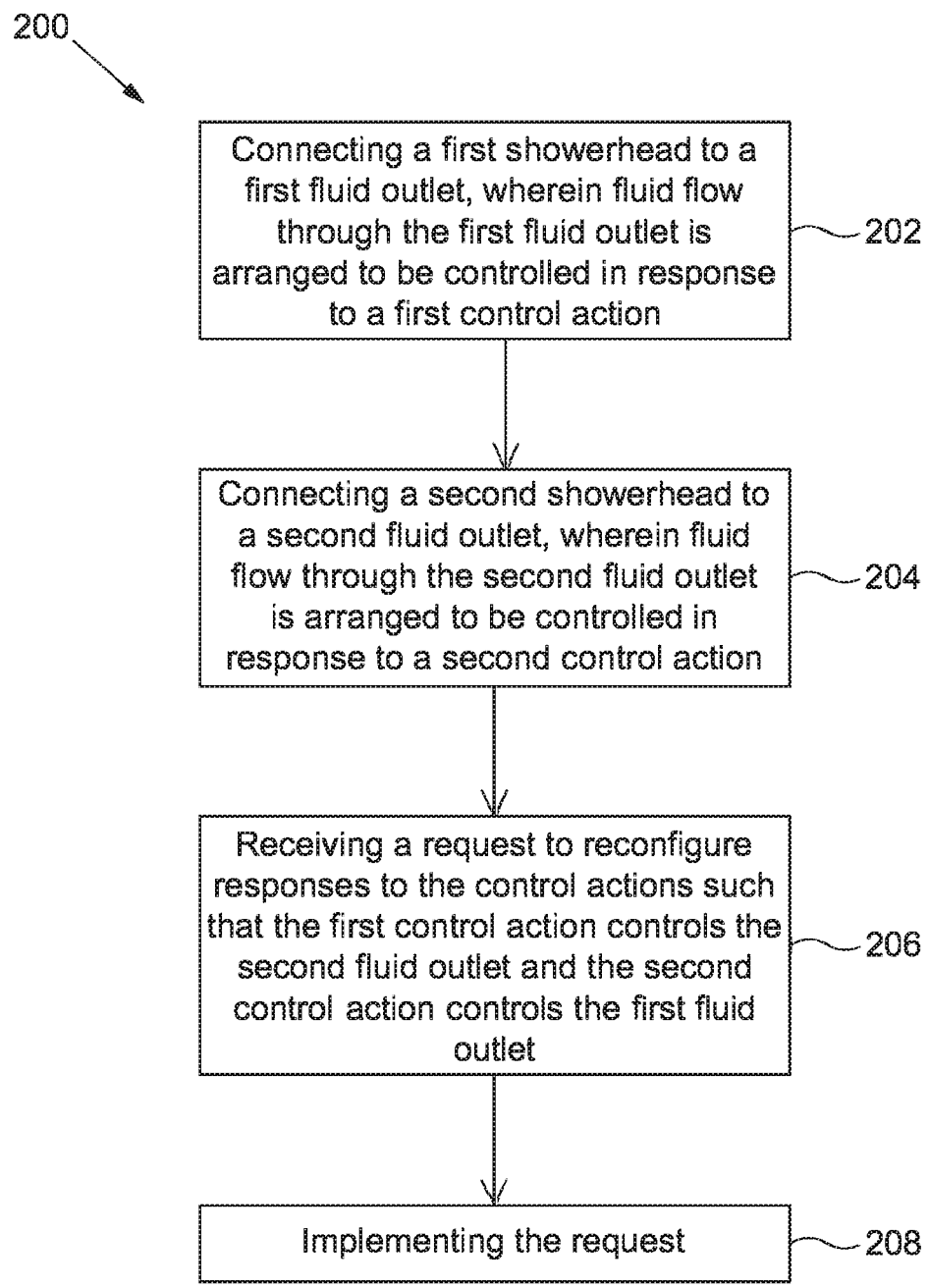
FIG. 2 shows a method for electronically reconfiguring shower outlet controls.

FIG. 2 provides a flow chart showing the method 200 described herein.

At step 202, a first showerhead 104 is connected to a first fluid outlet 404, wherein fluid flow through the first fluid outlet 404 is arranged to be controlled in response to a first control action.

At step 204, a second showerhead 106 is connected to a second fluid outlet 406, wherein fluid flow through the second fluid outlet 406 is arranged to be controlled in response to a second control action.

Steps 202 and 204 are generally performed by a shower installer. The installer may then test the shower control means 114, 116 to check that the installed shower 102 is functioning as expected or desired, and perform the following steps if the shower 102 does not function as expected. Alternatively, the following steps may be performed by a different person, optionally at a much later time.

At step 206, a request is received to reconfigure responses to the control actions such that the first control action controls the second fluid outlet 406 and the second control action controls the first fluid outlet 404. This reconfiguration may be referred to as outlet flipping.

In the embodiment being described, the request is generated by interaction with a user device 110. The user device 110 is in communication with a processor 112 which is arranged to control a valve 400 comprising the two fluid outlets 404, 406. The user device 110 is arranged to send instructions to the processor 112 which cause the processor to alter how the valve 400 is controlled.

At step 208, the request to flip the fluid outlets is implemented. In the embodiments being described, the implementation 208 is performed electronically, without any physical access to the fluid outlets 404, 406 or disconnection and reconnection of pipes 104a, 106a or hoses or the likes being required.

The skilled person will appreciate that this flipping of the outlets is normally performed in response to realizing that the shower 102 had been incorrectly installed, with the showerheads 104, 106 each connected to the wrong outlet 404, 406. However, there may be other reasons for reversing the outlet controls, for example if the first control means 114 can be more easily reached by a user than the second control means 116, but that user prefers to use the second showerhead 106.

In the embodiment being described, the outlet flipping request is provided via a computer application. In alternative or additional embodiments, a different means of making the request may be provided, such as a button provided as part of the bathing apparatus 100, for example located on the valve box 108, or a specific tool used by an installer.

Figure 3:
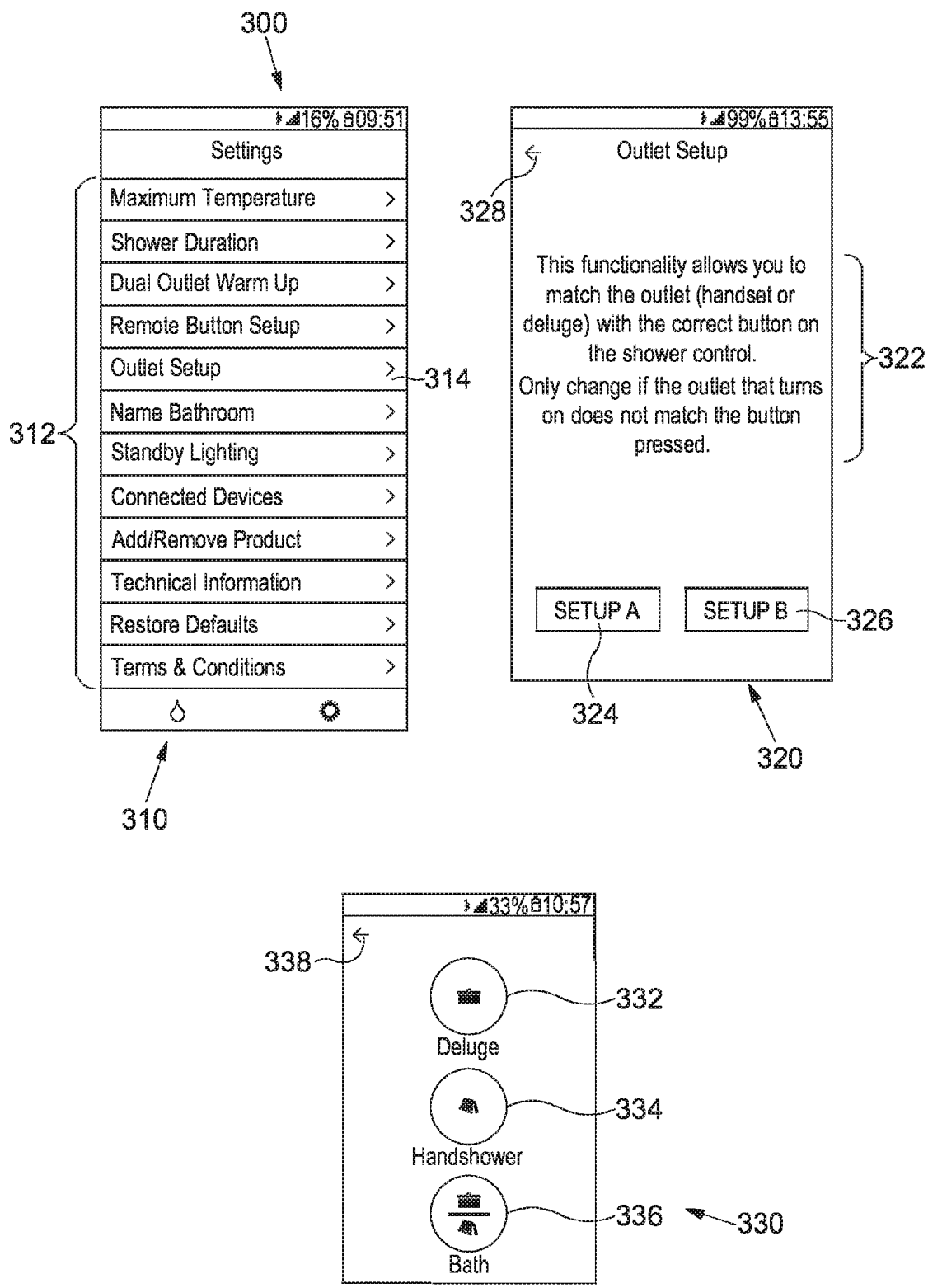
FIG. 3 shows schematic views of a computer application used to implement the method of FIG. 2.
Figure 4:
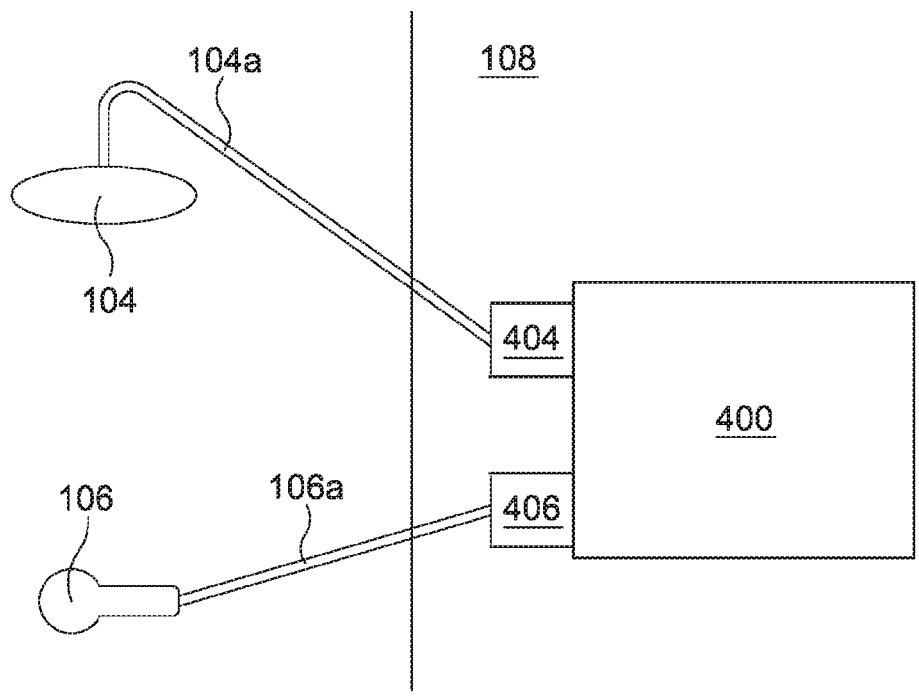
FIG. 4 is a schematic representation of a valve box connected to a dual outlet shower.

FIG. 3 shows a selection of screenshots 300 from a schematic example of a computer application arranged to allow a request for outlet flipping. In the embodiment being described, the application is arranged for use with a touch screen device 110.

A first screenshot 310 shows a settings menu page with a list of options 312 selectable by a user. One of the options is "Outlet Setup" 314.

Once a user selects the "Outlet Setup" option 314, a second page 320 is displayed. The second page comprises text 322 explaining that the page allows the control means 114, 116 to be matched to the showerheads 104, 106, and that the outlets should only be reconfigured if there is a mismatch.

A first button 324 labelled "Setup A" is highlighted to indicate that Setup A is the current outlet configuration. In the embodiment being described, Setup A is the signal from the first control means 114 being sent to the first fluid outlet 404 and the signal from the second control means 116 being sent to the second fluid outlet 406.

Selecting the first button 324 has no effect whilst the first button 324 is highlighted. In alternative embodiments, a pop-up message indicating that Setup A is the current setup, or similar, may be displayed in response to selection of the first button 324 whilst the first button 324 is highlighted.

A second button 326 labelled "Setup B" is provided. In the embodiment being described, Setup B is the signal from the first control means 114 being sent to the second fluid outlet 406 and the signal from the second control means 116 being sent to the first fluid outlet 404.

Selecting the second button 326 reconfigures the outlets as described above and results in the second button 326 becoming highlighted to indicate that Setup B is the current outlet configuration. The first button 324 is no longer highlighted once the second button 326 has been selected.

In alternative or additional embodiments, entry of a password or other authorization may be required to flip the outlets so as to reduce the likelihood of meddling or accidental outlet reconfiguration.

A "back" arrow 328 is also provided to allow a user to return to the settings menu page 310.

In the embodiment being described, the computer application is arranged to be useful to a user of the bathing apparatus 100 after installation. In such embodiments, the computer application may be arranged to allow a user to control the bathing apparatus 100 via a user device 110 on which the application is installed. The application is arranged to allow a user to raise or lower water temperature and raise or lower flow rate through any one or more selected outlets, such as the shower 102 and/or one or more taps of a bath (not shown) over which the shower 102 is located. The computer application may therefore be used to control the bathing apparatus 100 in use, as well as to remedy issues encountered in installation.

The dual-outlet shower 102 can also be controlled using the computer application instead of the first and second rotatable knobs 114, 116.

In the embodiment being described, the computer application is also arranged to allow a user to operate the dual-outlet shower 102. A control page 330 is provided with a first button 332 labelled "Deluge" and arranged to activate the fixed showerhead 104. The first button 332 performs the same function as the first control means 114 and operates in the same way in that the control signal is relayed to the valve 400 to be controlled via the processor 112. A second button 334 labelled "Handshower" is arranged to activate the moveable showerhead 106. The second button 334 performs the same function as the second control means 116 and operates in the same way in that the control signal is relayed to the valve 400 to be controlled via the processor 112. A third button 336 labelled "Both" is arranged to activate both showerheads 104, 106 and performs the same function as the first and second control means 114, 116 used together. In addition, a "back" arrow 338 is provided to allow a user to return to a menu page.

In addition to allowing a user to control the bathing apparatus 100, the application is also arranged to allow a user to customize his or her account, which may be logged into using a username and password. For example, a background image and user icon may be selected and used, a password changed, and/or a "favorites" page may be provided for a user's most commonly-used options. In the embodiment being described, the application is also arranged to allow a user to save particular settings (e.g. desired shower temperature and duration, or desired bath depth and temperature) for future use. Default options may also be provided in at least some embodiments, and may be editable to allow adjustment to user preferences. The saved settings can then be selected and implemented automatically.

In the embodiment being described, any user can customize his or her user account, or enter information on particular settings for future use at any point, whether or not the bathing apparatus 100 is in use. In alternative or additional embodiments, some options not directly linked to controlling the bathing apparatus 100 may be blocked whilst the bathing apparatus 100 is in use. For example, in systems implementing the invention of the applicant's corresponding United Kingdom Patent Application No. GB 1700631.3, entitled "BATH FILLING" and filed on Jan. 13, 2017, the contents of which are incorporated by reference herein, control instructions related to learning a user's preferences from bath usage may be blocked whilst a different user is using the bathing apparatus 100.

In the embodiment being described, when the bathing apparatus 100 is in use by a first user, other users cannot control the bathing apparatus 100 via the computer application. Bathing control instructions from other users are blocked until a pre-defined condition is met, as described in the applicant's corresponding United Kingdom Patent Application No. GB 1700636.2, entitled "CONTROL OF BATHING APPARATUS" and filed on Jan. 13, 2017, the contents of which are incorporated by reference herein. In alternative embodiments, the application may not block user instructions, or may use a different blocking method.

In the embodiment being described, the user device 110 must be securely paired with the bathing apparatus 100 before that device 110 can be used to control one or more functions of the bathing apparatus 100, including requesting outlet flipping. Pairing is performed by activating a pairing interface whilst the device 110 is within a pairing region. The requirement for activation of an interface separate from the device 110 whilst the device 110 is within a pairing region may reduce or prohibit unauthorized users' access to the one or more functions of the bathing apparatus 100. In the embodiment being described, the pairing interface is a button in the same room as the bathing apparatus 100. The pairing region is defined by an area in which a signal can be exchanged between the device and a pairing station. The applicant's corresponding United Kingdom Patent Application No. GB 1700633.9, entitled "BATHING CONTROL SECURITY" and filed on Jan. 13, 2017, the contents of which are incorporated by reference herein, provides further details of how the pairing may be performed.

In the embodiment being described, the application offers the ability to control multiple different bathing apparatuses 100 with the same user account and device 110.

In alternative embodiments, the computer application is arranged to be used by an installer of the shower 102 only and does not offer features not related to shower installation.

The skilled person will appreciate that these screenshots 300 are provided by way of example only and are in no way intended to limit the invention to the particular presentation and/or content shown. In particular, fewer, more or different user options may be presented, the interface may have a different layout and/or control means, and different graphics may be used.

Figure 5:
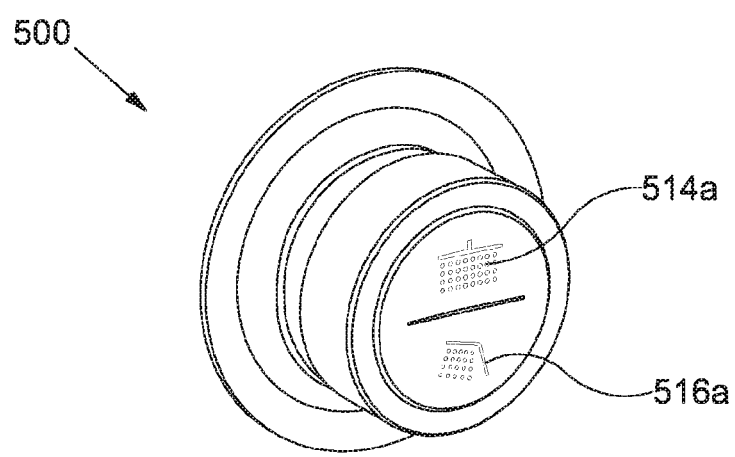
FIG. 5 shows a dual outlet shower control and indicator suitable for use with embodiments of the invention.

In alternative embodiments from that shown in FIG. 1, the shower controls 114, 116 may be replaced with a single on/off button 500, as shown in FIG. 5. When the dual outlet shower 102 is off, depressing and releasing the button 500 turns on whichever showerhead(s) 104, 106 has been selected by a user via the computer application. Either or both showerheads 104, 106 may be selected, as indicated in screenshot 330 in FIG. 3.

When the dual outlet shower 102 is on, depressing and releasing the button 500 turns off the selected showerhead(s) 104, 106.

In the embodiment shown in FIG. 5, the button 500 comprises a first label 514a and a second label 516a. The first label 514a is an image of a mounted showerhead. The second label 516a is an image of a hand-held showerhead. Label 514a is illuminated when the mounted showerhead 104 is in use. Label 516a is illuminated when the hand-held showerhead 104 is in use. The labels 514a, 516a therefore provide a visual indicator of which showerhead is in use.

In alternative or additional embodiments, the button 500 may also provide showerhead control functionality. For example, pressing and releasing the button 500 once may activate the first showerhead 104, pressing and releasing the button 500 twice within a set time period may activate the second shower head 106, and pressing and holding the button 500, before releasing it after at least a set time period (e.g. 1 second, 2 seconds, etc.) may activate both showerheads 104, 106.

In alternative embodiments, the button 500 may be replaced with a display which simply indicates which shower head 104, 106 is in use, without providing any control functionality.

What is claimed is:

1. A reconfigurable bathing apparatus comprising:
   a first showerhead, the first showerhead being connected to a first fluid outlet;
   a second showerhead, the second showerhead being connected to a second fluid outlet; and
   a processor, the processor being arranged to control fluid flow through the first fluid outlet in response to a first control action and to control fluid flow through the second fluid outlet in response to a second control action;
   wherein the processor is arranged to be able to receive and implement a request to reconfigure the processor response to the first and second control actions such that the first control action controls the second fluid outlet and the second control action controls the first fluid outlet.

2. The reconfigurable bathing apparatus of claim 1, further comprising a valve, wherein the valve comprises the first and second fluid outlets and the processor is arranged to actuate the valve so as to control fluid flow through at least one of the first and second fluid outlets.

3. The reconfigurable bathing apparatus of claim 2, wherein the valve is a dual outlet shower valve.

4. The reconfigurable bathing apparatus of claim 2, wherein the valve is within a valve box and wherein the request is arranged to be implemented without opening the valve box.

5. The reconfigurable bathing apparatus of claim 4, wherein the valve box is located in or behind a wall, floor or ceiling of a room in which the bathing apparatus is located.

6. The reconfigurable bathing apparatus of claim 4, wherein the processor is within the valve box.

7. The reconfigurable bathing apparatus of claim 2, wherein the processor is integral with, on, or near the valve.

8. The reconfigurable bathing apparatus of claim 1, wherein the first showerhead is a hand-held showerhead and the second showerhead is a mounted showerhead.

9. The reconfigurable bathing apparatus of claim 1, wherein the first and second control actions are either:
   (i) use of a first control means and a second control means respectively; or
   (ii) differing uses of a single control means.

10. The reconfigurable bathing apparatus of claim 9, wherein the first and second control means or the single control means communicate electronically with the processor, and the processor electronically actuates the valve.

11. The reconfigurable bathing apparatus of claim 1, wherein the first and second control actions are user interactions with a graphical user interface.

12. The reconfigurable bathing apparatus of claim 1, wherein the request is sent from a remote device which is not a part of the bathing apparatus.

13. The reconfigurable bathing apparatus of claim 1, further comprising a housing containing the processor and the first and second fluid outlets, and wherein the request is received as an electronic signal from outside the housing.

14. The reconfigurable bathing apparatus of claim 1, further comprising (a) a label indicative of the first showerhead that is linked to the first control action and/or (b) a label indicative of the second showerhead that is linked to the second control action.

15. The reconfigurable bathing apparatus of claim 14, wherein the label indicative of the first showerhead and/or the second showerhead is part of a control means arranged to control fluid flow through the first or second fluid outlet, and wherein implementation of the request changes which fluid outlet is controlled by the control means.

16. A computer-implemented method of reconfiguring shower outlet controls for a shower having:
   a first showerhead, the first showerhead being connected to a first fluid outlet;
   a second showerhead, the second showerhead being connected to a second fluid outlet;
   the first fluid outlet being arranged to be controlled by a first control action; and
   the second fluid outlet being arranged to be controlled by a second control action, the method comprising:
   receiving a request to reconfigure a processor responses to the first and second control actions such that the first control action controls the second fluid outlet and the second control action controls the first fluid outlet; and
   implementing the request by the processor.

17. The computer-implemented method of claim 16, wherein the step of implementing the request is performed without the requirement of physical access to the first and/or second fluid outlets.

* * * * *